United States Patent
Matsubara et al.

(10) Patent No.: US 7,497,321 B2
(45) Date of Patent: Mar. 3, 2009

(54) CONVEYOR SYSTEM FOR PROCESSING LINE

(75) Inventors: Izuru Matsubara, Tokyo (JP); Hisashi Kyotani, Shiga (JP)

(73) Assignees: Taikisha Ltd., Tokyo (JP); Daifuku Co., Ltd., Osaka (JP)

( * ) Notice: Subject to any disclaimer, the term of this patent is extended or adjusted under 35 U.S.C. 154(b) by 0 days.

(21) Appl. No.: 11/453,659

(22) Filed: Jun. 15, 2006

(65) Prior Publication Data

US 2007/0000758 A1    Jan. 4, 2007

(30) Foreign Application Priority Data

Jun. 29, 2005   (JP) ............................. 2005-189077

(51) Int. Cl.
*B65G 7/00* (2006.01)

(52) U.S. Cl. ............... 198/465.4; 198/375; 198/345.3; 198/680; 198/867.01

(58) Field of Classification Search .............. 198/345.3, 198/375, 377.02, 680, 867, 465.4
See application file for complete search history.

(56) References Cited

U.S. PATENT DOCUMENTS

| | | | | |
|---|---|---|---|---|
| 2,657,666 A | * | 11/1953 | Fowler | 118/322 |
| 2,657,686 A | * | 11/1953 | Brandenfels | 601/99 |
| 2,953,236 A | * | 9/1960 | Buchner et al. | 198/384 |
| 2,953,238 A | * | 9/1960 | Buccicone | 198/690.1 |
| 3,459,313 A | * | 8/1969 | Brummel et al. | 414/728 |
| 5,141,093 A | * | 8/1992 | Alexander | 198/345.1 |
| 5,653,324 A | * | 8/1997 | Toeniskoetter | 198/345.3 |
| 5,686,148 A | * | 11/1997 | Suzuki | 427/444 |
| 6,673,153 B2 | * | 1/2004 | Ehrenleitner et al. | 118/423 |
| 6,676,755 B2 | * | 1/2004 | Ehrenleitner et al. | 118/423 |
| 7,134,541 B2 | * | 11/2006 | Matsubara et al. | 198/468.01 |
| 2004/0149542 A1 | * | 8/2004 | Kyotani | 198/375 |
| 2005/0061239 A1 | | 3/2005 | Kyotani | |

FOREIGN PATENT DOCUMENTS

CA    2490099    6/2005

* cited by examiner

*Primary Examiner*—Gene Crawford
*Assistant Examiner*—Kavel P Singh
(74) *Attorney, Agent, or Firm*—Fildes & Outland, P.C.

(57) ABSTRACT

A conveyor system including a crank arm having a base end portion rotatably supported by a second support axle and a free end portion rotatably supporting a suspended supporting apparatus, and a swinging arm having a base end portion fixed to a first support axle and a front end portion coupled to an intermediate position of the crank arm. A movable bearing stand supporting the second support axle is provided to be movable toward and away from a fixed bearing stand supporting the first support axle. Further, a suspended section parallel link mechanism of a suspended supporting apparatus is so configured that a free end support axle is located above a line connecting suspension pins at both ends of an upper frame.

3 Claims, 11 Drawing Sheets

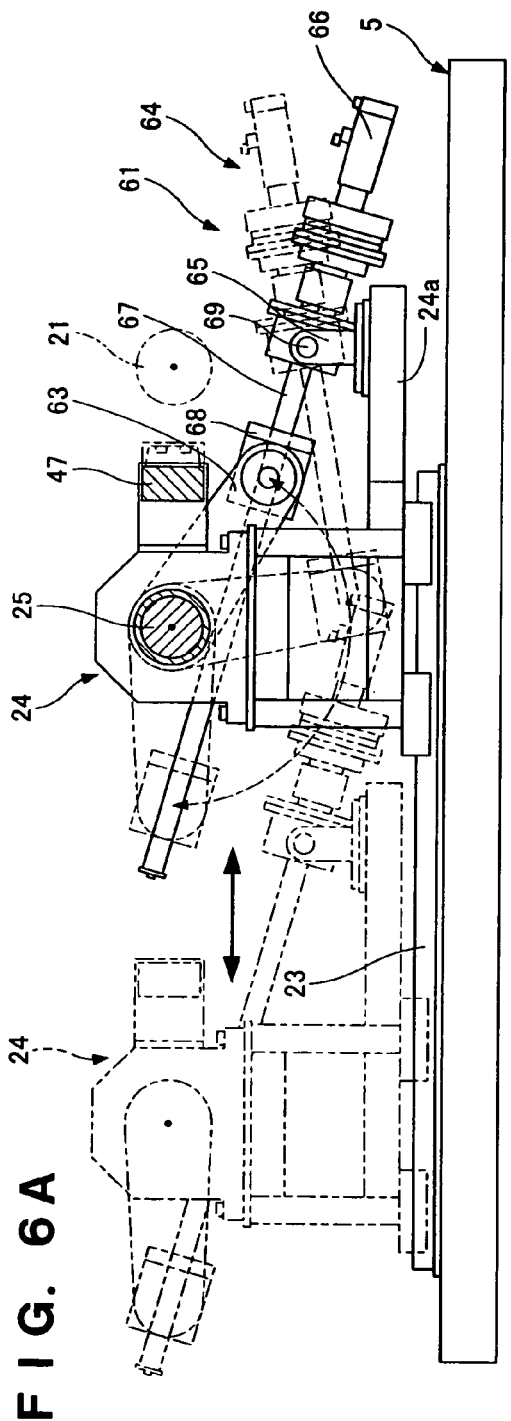
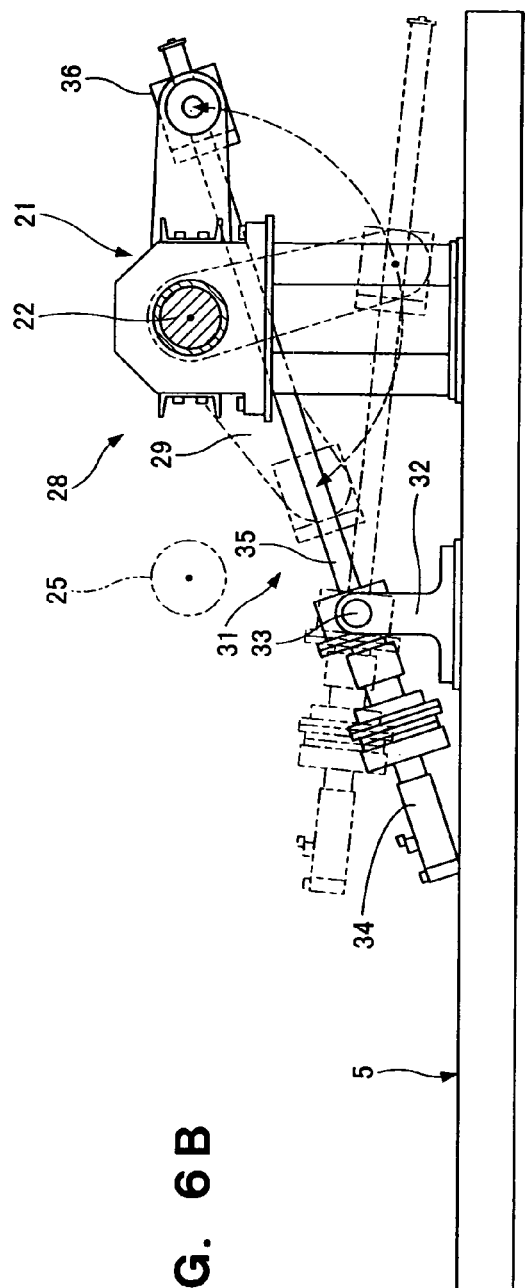
FIG. 6A
FIG. 6B

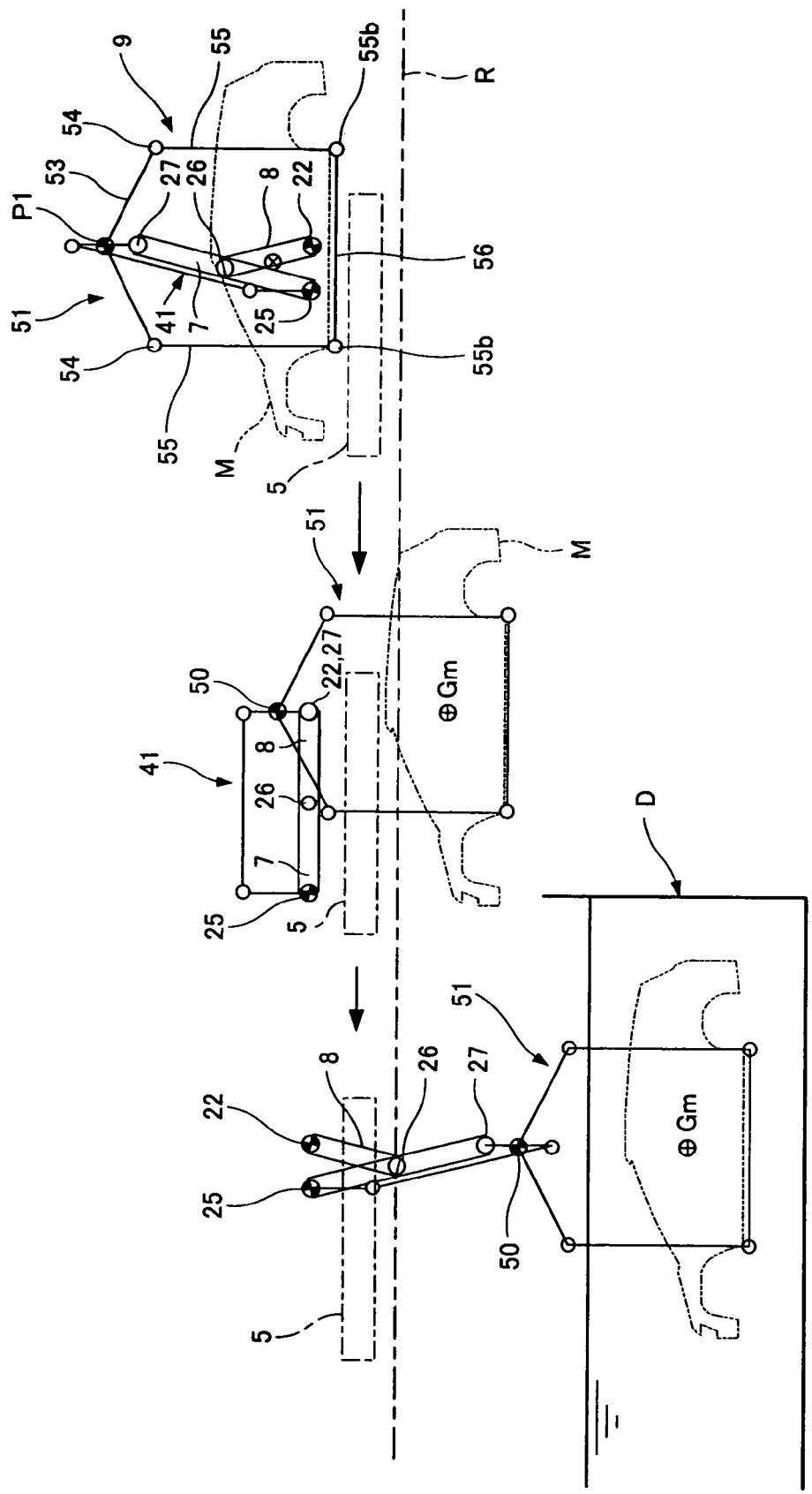

F I G. 10A
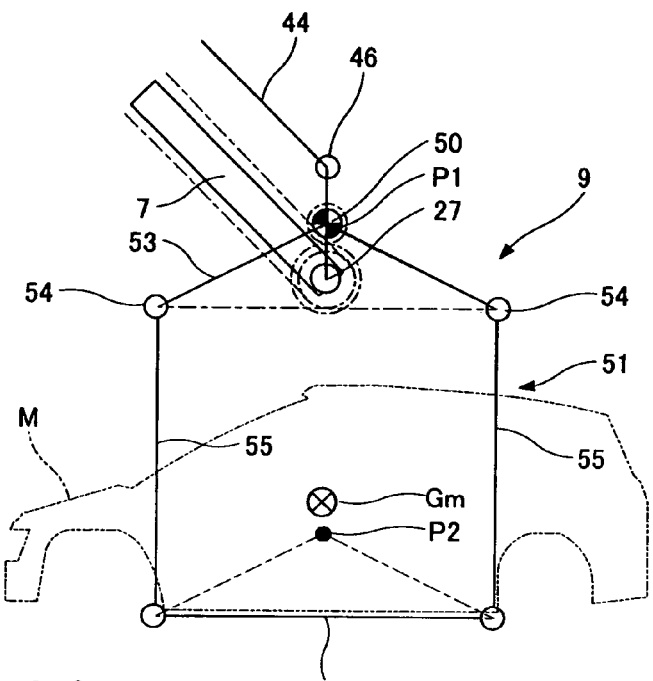
F I G. 10B
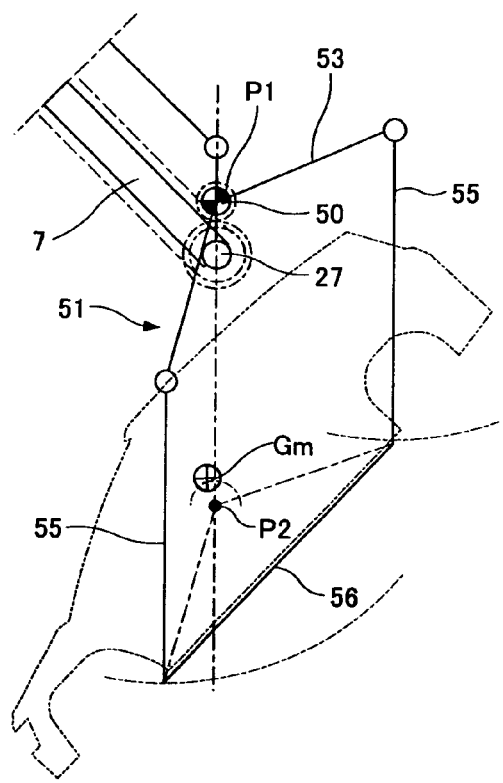
F I G. 10C
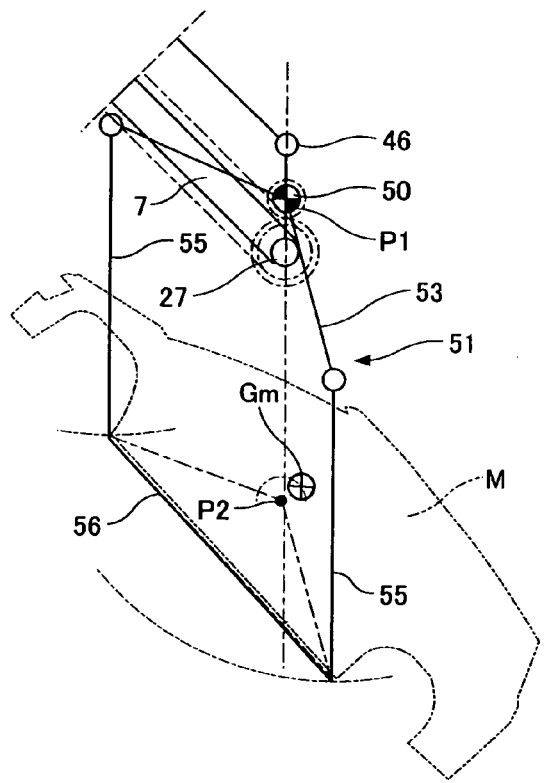

CONVEYOR SYSTEM FOR PROCESSING LINE

BACKGROUND OF THE INVENTION

1. Field of the Invention

The present invention relates to a conveyor system in which a moving body is provided to be travelable along a processing line installed with a processing liquid tank, and a conveyed object held on the moving body is immersed into a processing liquid in the processing liquid tank and processed.

2. Description of the Related Art

A known conveyor system of the above mentioned type is disclosed in International Publication WO 02/053482 for example.

In the known conveyor system, a conveying carriage (moving body) travelable over an immersion tank (processing liquid tank) is provided, a bilateral pair of steering means (swinging arms) are provided on each front and rear sides of the conveying carriage, a front transverse cross rail is provided to extend between the pair of front steering means, a rear transverse cross rail is provided to extend between the pair of rear steering means, and a vehicle body (conveyed object) is held on these front and rear transverse cross rails. The steering means are rotated to lower individually or in concert with each other so that the vehicle body on the transverse cross rails is lowered and immersed in a liquid paint (processing liquid).

However, according to the constitution of the known conveyor system, the following matters exist.

Since the entire or a part of the vehicle body is raised/lowered along a descending trajectory in a circular arc direction, the immersion tank needs to have a large entry/exit opening for the vehicle body in the travel direction of the conveying carriage. In addition, since the raising and lowering trajectory of the vehicle body is in a circular arc direction, it is difficult to control the immersing/removing postures of the vehicle body into/from the immersion tank.

SUMMARY OF THE INVENTION

It is an objective of the present invention to provide a conveyor system in which a conveyed object is raised and lowered along a trajectory that is nearly a vertical line, so that the posture control of the conveyed object is facilitated and the raising and lowering operation for processing the object can be performed by way of simplified control.

In order to attain the above-described objective, the present invention provides a conveyor system in which a moving body provided to be travelable along a processing line installed with a processing liquid tank, a conveyed object held on the moving body is immersed into a processing liquid in the processing liquid tank and processed, wherein the moving body comprises a suspended supporting apparatus for supporting the conveyed object, a raising and lowering device for raising and lowering the suspended supporting apparatus, and a posture adjustment apparatus for operating the suspended supporting apparatus and adjusting a posture of the conveyed object. The raising and lowering device comprises a first support axle disposed on one of front and rear sides of the moving body in a travel direction thereof and extending orthogonally to the travel direction, a second support axle disposed on the other of the front and rear sides of the moving body in the travel direction thereof and extending in parallel to the first support axle, the second support axle being movable towards and away from the first support axle, a crank arm rotatably supported at a base end portion thereof by the second support axle and rotatably supporting the suspended supporting apparatus at a free end portion thereof, a swinging arm fixed at a base end portion thereof to the first support axle and coupled at a front end portion thereof to an intermediate position of the crank arm by means of a coupling axle, and an arm drive unit for causing the crank arm to rotate about the second support axle. The suspended supporting apparatus comprises a suspended section parallel link mechanism including an upper frame, a pair of suspended frames, and a linking frame, wherein the upper frame is rotatably supported at a medium section thereof on the free end portion of the crank arm, the pair of suspended frames is rotatably suspended from both ends of the upper frame, the linking frame rotatably links lower sections of the suspended frames and supports the conveyed object, and the support section of the upper frame and the linking sections between the upper frame and the suspended frames are configured to have a positional relationship to form a triangle thereamong.

BRIEF DESCRIPTION OF THE DRAWINGS

FIG. 6A is a side view illustrating the drive section of a raising and lowering apparatus of the conveying carriage;

FIG. 6B is a side view illustrating the drive section of a posture adjustment apparatus of the conveying carriage;

FIGS. 9A to 9C are schematic side views each illustrating an operation of the raising and lowering apparatus;

FIGS. 10A to 10C are schematic side views each illustrating an operation of the posture adjustment apparatus.

DESCRIPTION OF THE PREFERRED EMBODIMENT

As an example of the conveyor system of the present invention, a painting line system provided with a raising and lowering apparatus will be described below with reference to the appended drawings. The painting line system is employed in an automobile production plant, for example, to perform the pretreatment such as degreasing and phosphating treatment and the undercoating such as electro-deposition coating of a vehicle body (conveyed object) while moving the vehicle body along the painting line (processing line).

Figure 4:
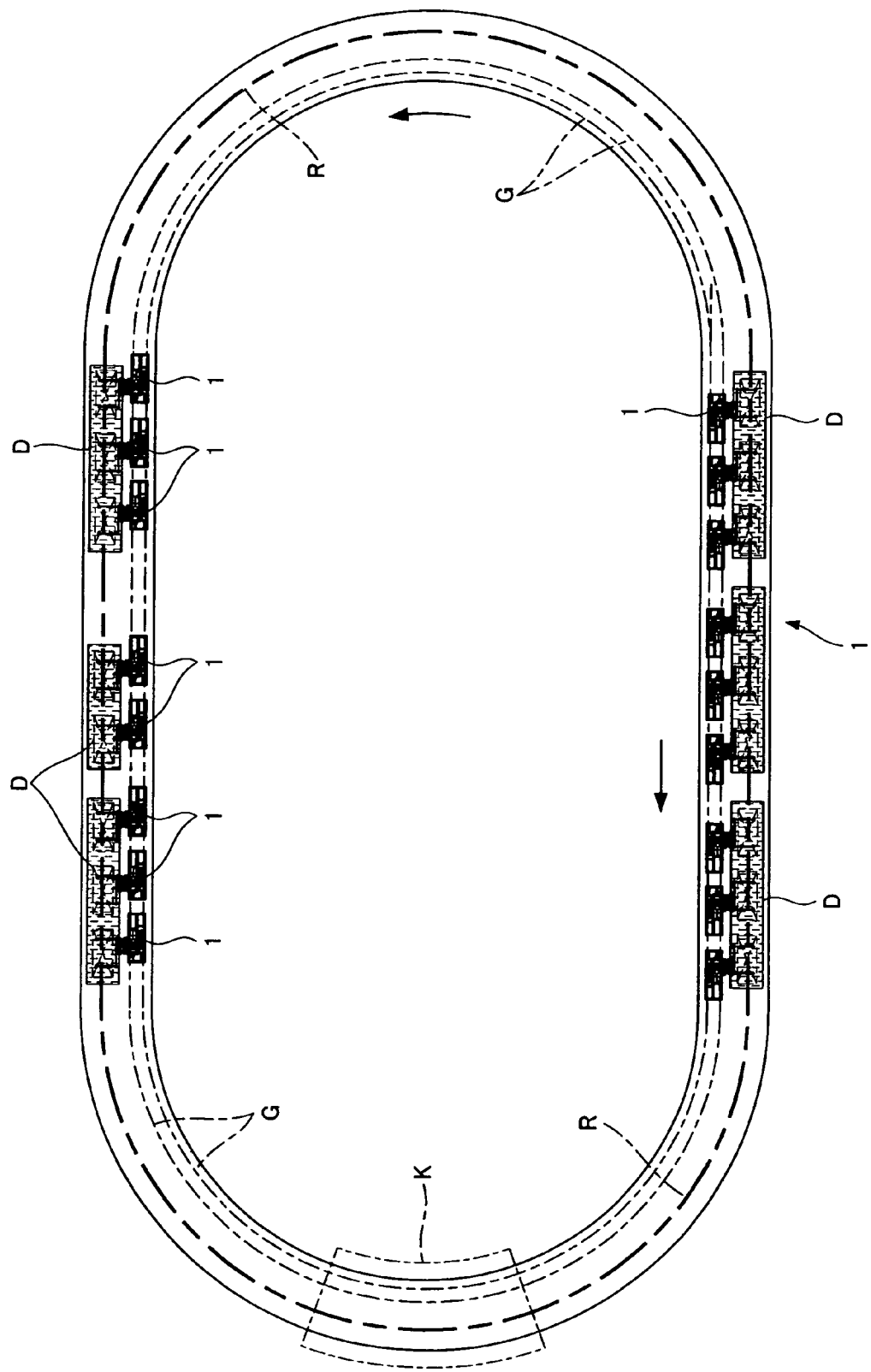
FIG. 4 is a general schematic plan view of a painting line system provided with the conveying carriage.

As shown in FIG. 4, the painting line R may be in an endless elliptical loop form in a plan view (or side view) thereof, for example, or a rectangular closed path formed by connecting linear ongoing and returning paths by means of a traverser that is a moving apparatus between the paths. Disposed at prescribed locations along the painting line R are a plurality of processing liquid tanks D for hot washing, degreasing, phosphating, water washing and the like, and a loading/unloading unit K. The processing liquid tanks D each contains a processing liquid (for example, an electrodeposition solution or a washing solution). Inside each processing liquid tanks D, painting electrodes are disposed selectively on the bottom surface or lateral side surfaces.

Figure 1:
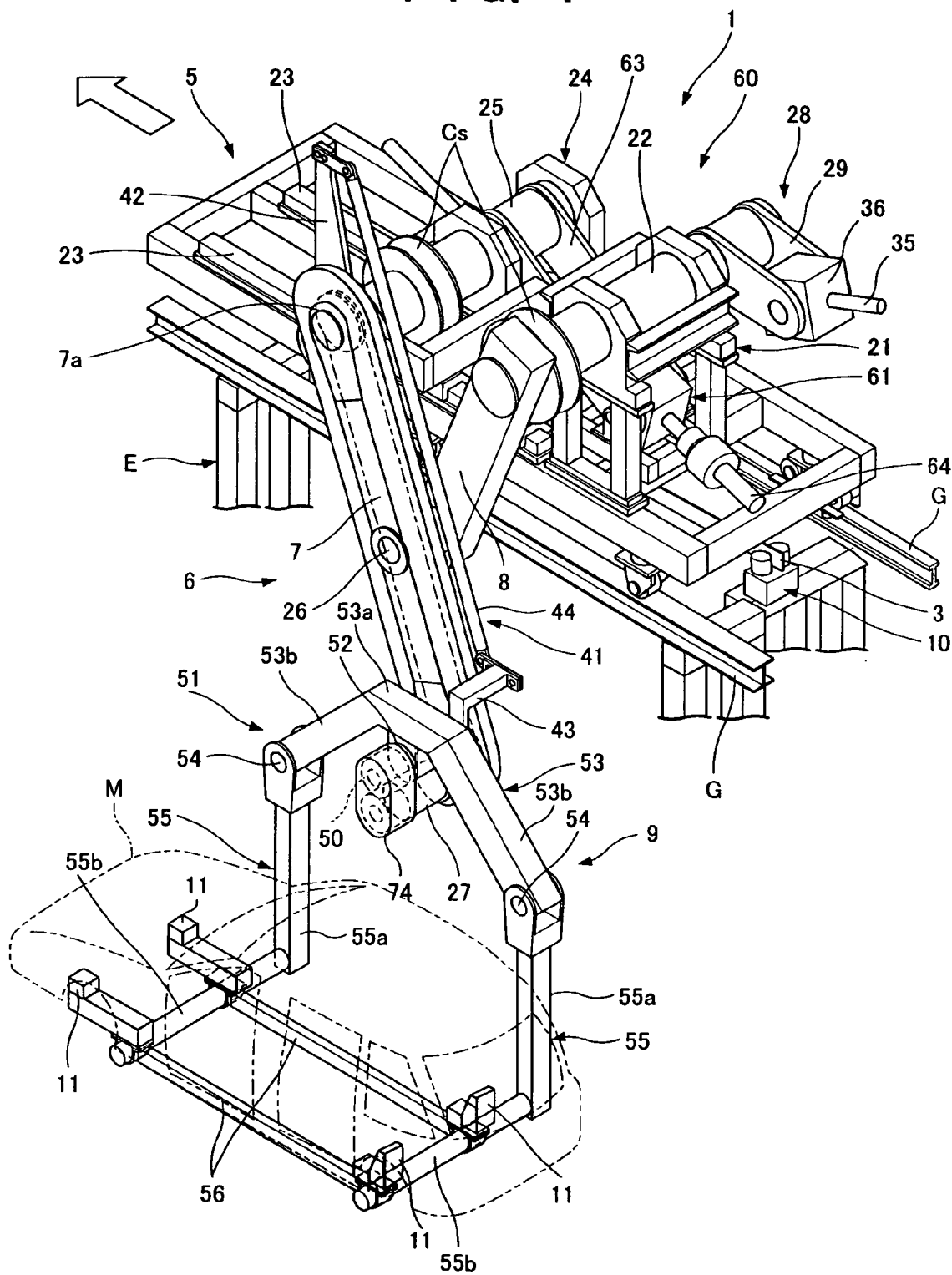
FIG. 1 is a perspective view of a conveying carriage of a conveyor system according to an embodiment of the present invention.
Figure 2:
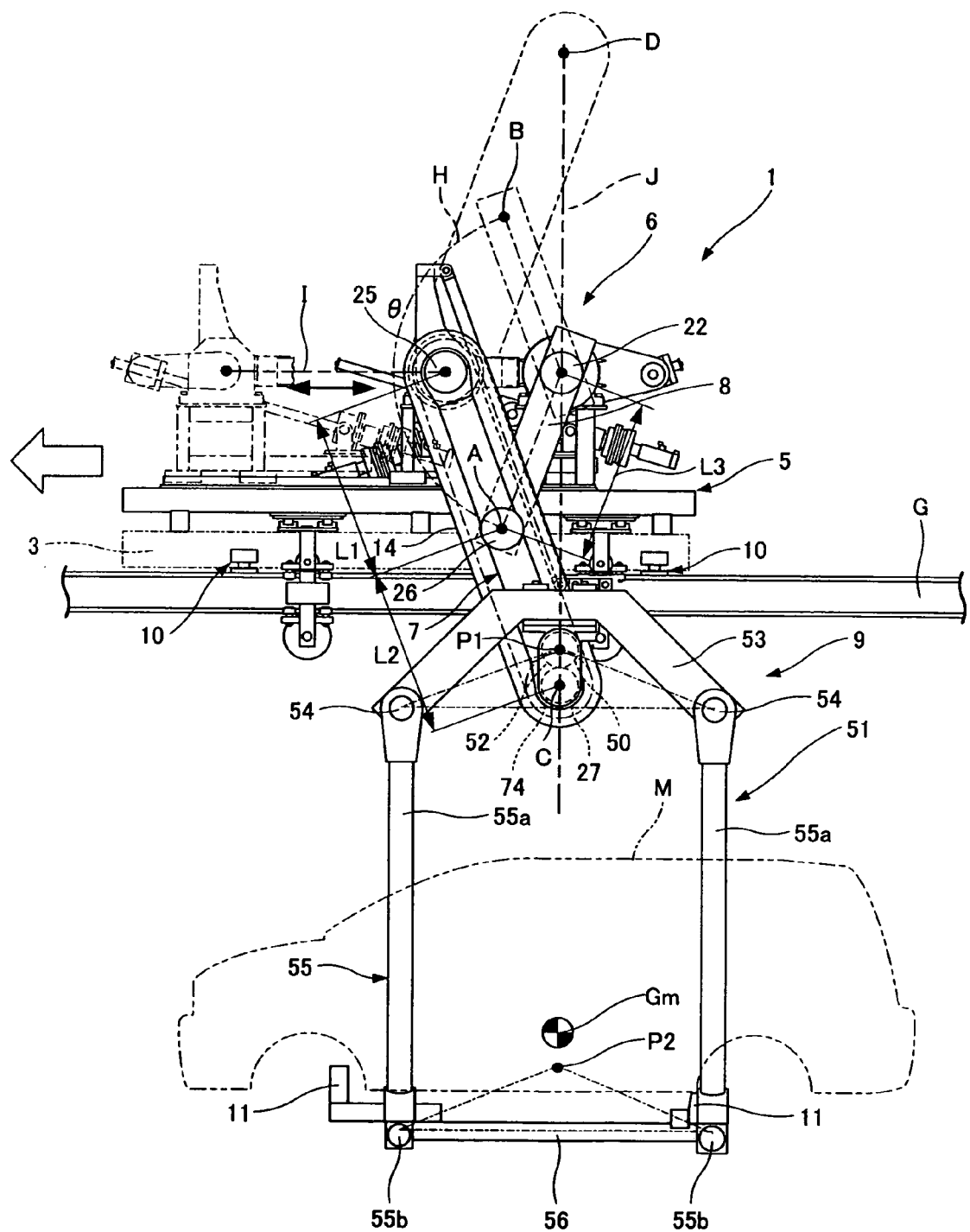
FIG. 2 is a general side view illustrating a state of painting operation of the conveying carriage of the conveyor system.
Figure 3:
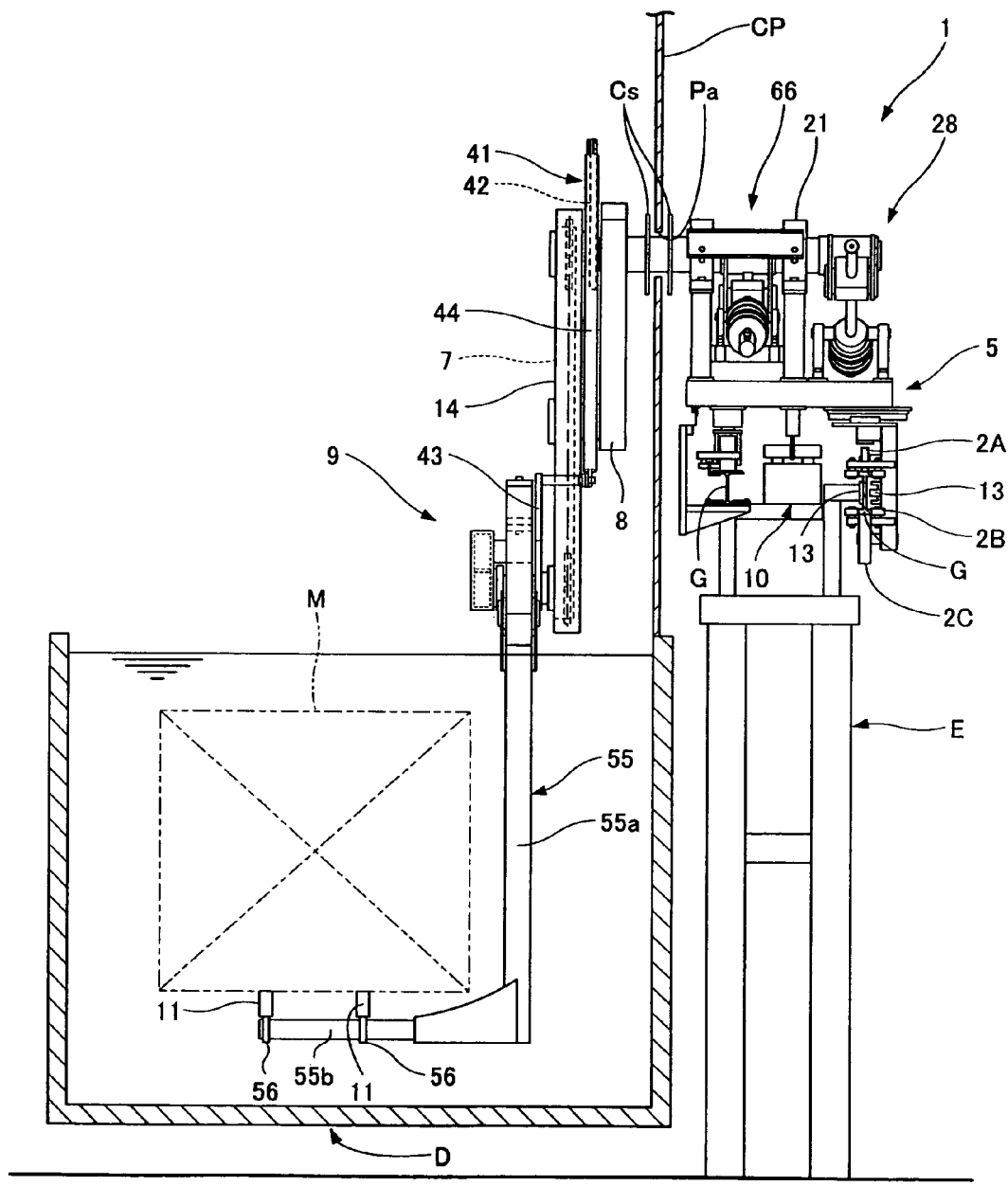
FIG. 3 is a general front view illustrating the state of painting operation of the conveying carriage of the conveyor system.

As shown in FIG. 1 to FIG. 3, a guiding frame E is disposed on one side of the processing liquid tank D, a pair of right and left travel rails G are installed parallel to the painting line R on this guide frame E, and a plurality of conveying carriages 1 are disposed to be able to freely travel (move) by being guided by the travel rails G. The conveying carriage 1 is described as an example of the moving body, but the "moving body" also includes a suspended travel body that can travel and move while being guided and supported by the rails installed on the ceiling.

In the conveying carriage 1, a crank-type raising and lowering apparatus 6 having a crank arm 7 and a swinging arm 8 is mounted on a carriage body 5 having wheels 2A to 2C guided by the travel rails G. Furthermore, a suspended supporting apparatus 9 is provided at the free end portion of the crank arm 7 of the raising and lowering apparatus 6, and a vehicle body M which is a conveyed object is held by a holding tool 11 of the suspended supporting apparatus 9.

Figure 5:
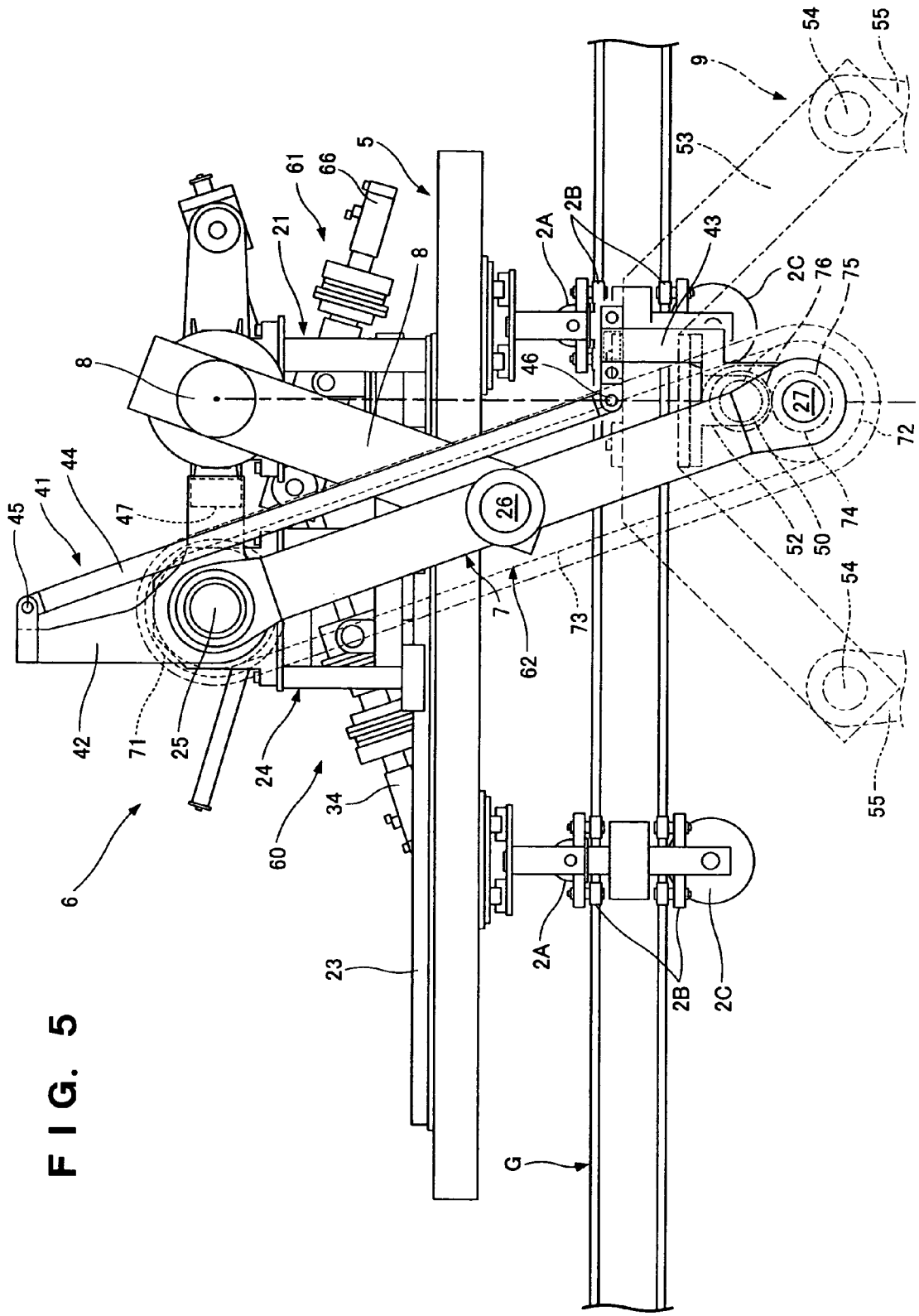
FIG. 5 is a partial enlarged side view illustrating the conveying carriage.
Figure 8:
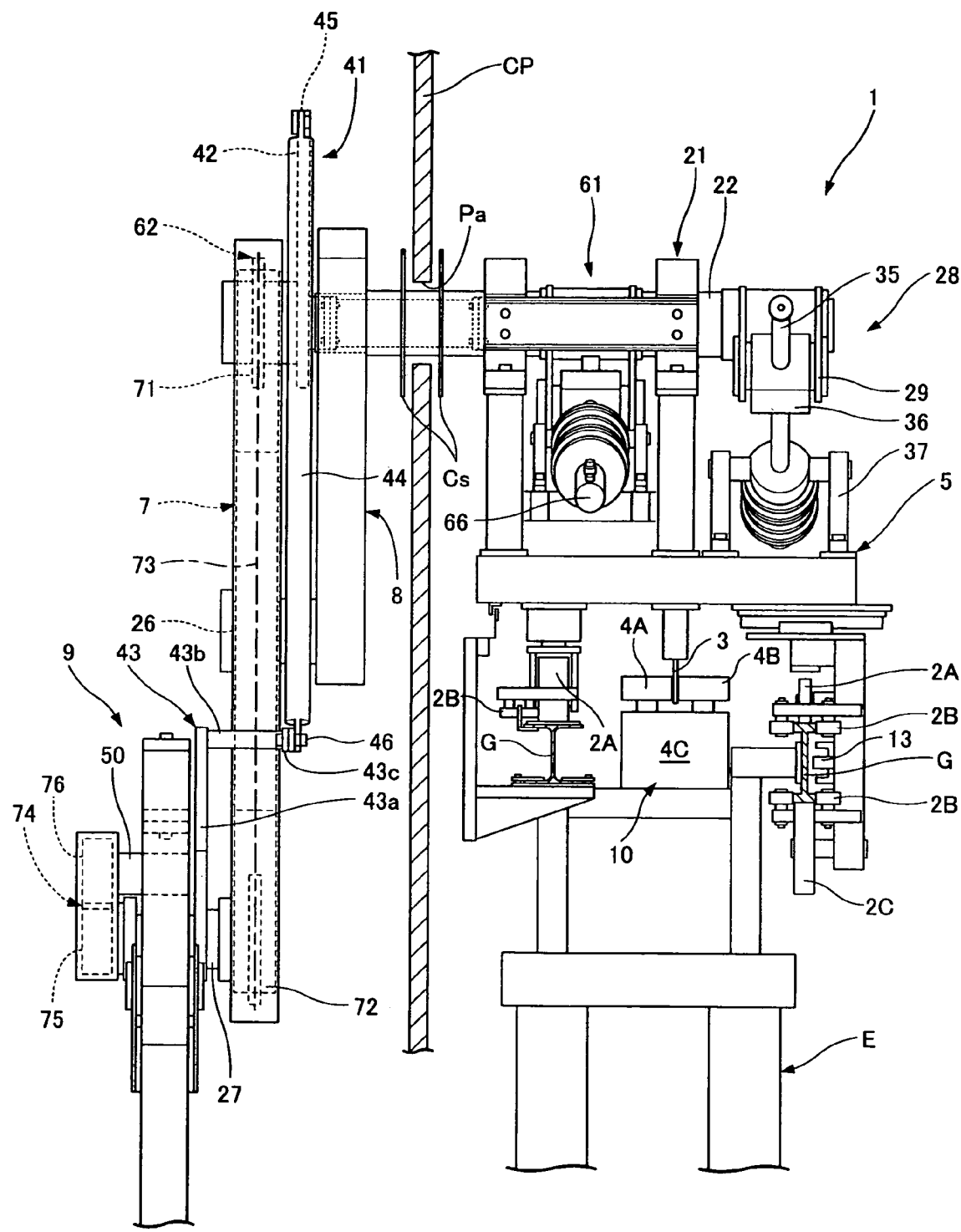
FIG. 8 is a partial enlarged front view illustrating the conveying carriage.

As shown in FIG. 5 and FIG. 8, in each of the four corner positions of the carriage body 5, there are provided travel wheels 2A for traveling over the travel rails G, vibration-preventing wheels 2B abutted against the travel rails G from both lateral sides and preventing the vibrations of the carriage body 5, and rise-preventing wheels 2C abutted against the bottom surface of the travel rails G and preventing the carriage body 5 from being raised up. The carriage body 5 is provided at the underside thereof with a friction plate (friction portion) 3 hanging downward and oriented in the travel direction. Further, a guide frame E is provided along the travel rail G. The guide frame E is also provided at a prescribed pitch with a pressure roller travel apparatus (also referred to as a friction roller travel apparatus) 10 of a passive type which is comprised of a pair of pressure rollers 4A, 4B sandwiching the friction plate 3 and a pressure roller rotation drive apparatus (electric motor) 4C. Such a configuration makes it possible to achieve reduction in weight and simplification of the conveying carriage 1, thus contributing to cost reduction. It goes without saying that a travel drive apparatus which drives the travel wheels 2A to rotate can be provided on the carriage body 5 to obtain a self-propelled travel apparatus. Further, the carriage body 5 is provided with a current collection apparatus 13 for collecting the drive power from the power feed rail installed on the side surface along one of the travel rails G. This current collector apparatus 13 is of a contact type but may be of a contactless type.

As shown in FIGS. 5 to 8, the carriage body 5 includes a fixed bearing stand 21 erected on the rear side thereof in the travel direction, and a first support axle 22 extending in the horizontal direction perpendicularly to the travel direction is rotatably supported on the fixed bearing stand 21. The carriage body 5 further includes a pair of right and left guide rails 23 laid along the travel direction on the front side of the carriage body 5 in the travel direction, and a movable bearing stand 24 is movably disposed on the respective guide rails 23 via the thrust bearings. Furthermore, a second support axle 25 extending in the horizontal direction, which is perpendicular to the travel direction, is rotatably supported by the movable bearing stand 24, and the first support axle 22 and second support axle 25 are disposed in the same horizontal plane. A base portion of the swinging arm 8 is fixed to one end side (side of the processing liquid tank D) of the first support axle 22, and the base portion of the crank arm 7 is rotatably supported via a bearing 7a on one end side (side of the processing liquid tank D) of the second support axle 25. The arm cover 14 is attached to the crank arm 7 and covers and protects the below-described wrapping connector drive apparatus 62.

As shown in FIG. 2, the distal end portion of the swinging arm 8 is rotatably linked via a linking shaft 26 to the medium portion of the crank arm 7, and the suspension support apparatus 9 is supported via the below-described movable short link 43 on the free end shaft 27 on the distal end side of the crank arm 7. Here, the L1:L2:L3=1:1:1 is the optimum setting, where L1 stands for the length of the crank arm 7 from the second support axle 25 to the linking shaft 26, L2 stands for the length of the crank arm 7 from the linking shaft 26 to the free end shaft 27, and L3 stands for the length of the switching arm 8 from the first support axle 22 to the linking shaft 26. The reason may be as follows. As shown in FIG. 2, is the first support axle 22 is rotary driven, the switching arm 8 is rotated within the optimum angle $\theta°$ (in the figure, for example, 160°) range, and the linking shaft 26 is moved between points A⇔B on the first circular arc trajectory H, then the free end shaft 27 of the crank arm 7 will move along the vertical trajectory J between points C⇔D, while the second support axle 25 is moved reciprocally on the linear trajectory I along the travel direction via the movable bearing stand 24. Here, if the displacement of the second support axle 25 in the horizontal direction is within the prescribed allowed range, a trajectory in an almost vertical direction may be formed even with L1:L2:L3≈(meaning nearly equal to) 1:1:1.

Figure 7:
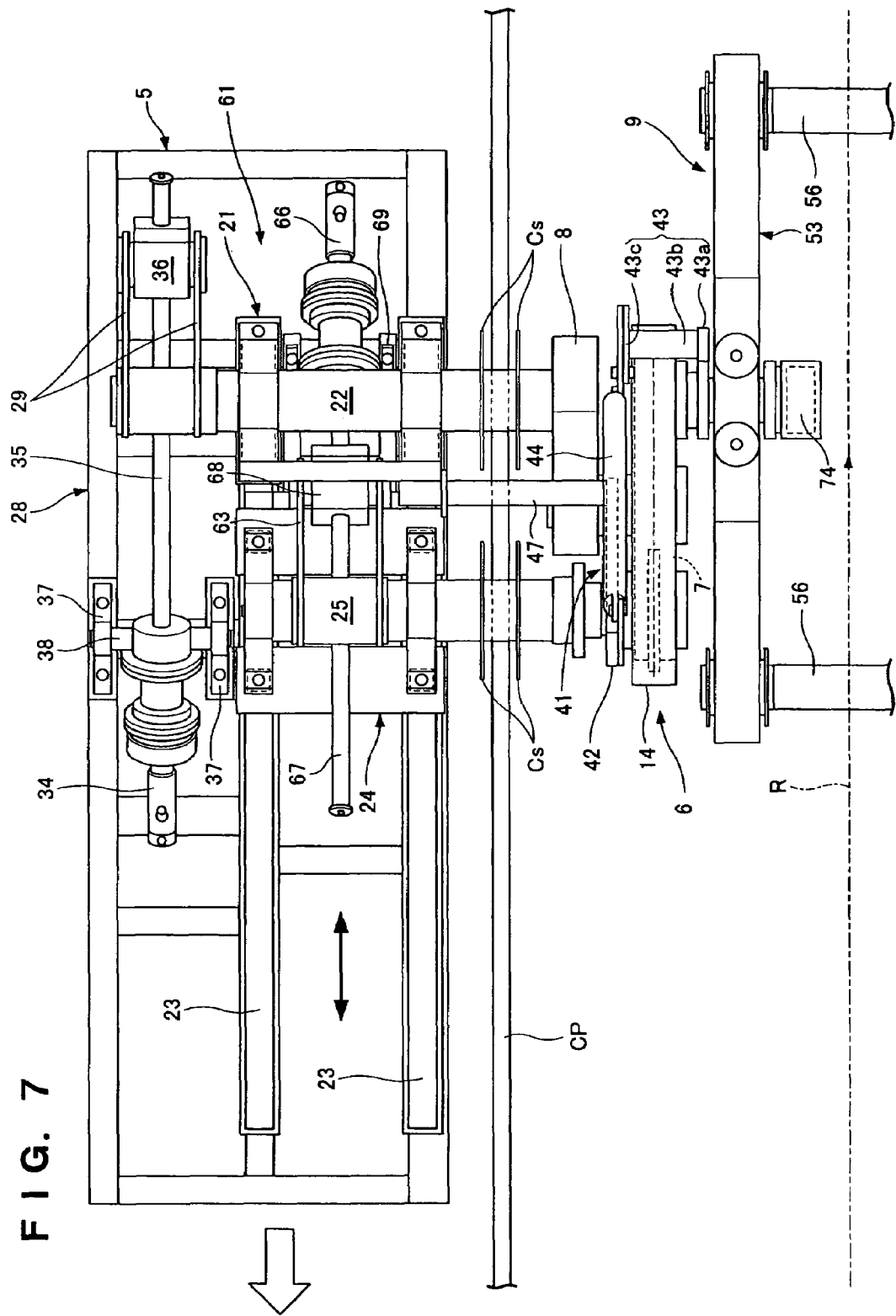
FIG. 7 is a partial enlarged plan view illustrating the conveying carriage.

As shown in FIG. 5 and FIG. 7, an arm section horizontal link mechanism 41 is provided at the crank arm 7. This arm section horizontal link mechanism 41 comprises a fixed short link 42, a movable short link 43, and a linking long link 44. The fixed short link 42 is rotatably linked to the crank arm 7, and fixedly linked to the movable bearing stand (moving body) 24 via a fixing beam 47. The movable short link 43 is parallel to and has the same length as the fixed short link 42, and is rotatably linked to the free end shaft 27 of the crank arm 7. The linking long link 44 is parallel to and has the same length as the crank arm 7, and is rotatably linked to the fixed short link 42 and movable short link 43 via the linking pins 45, 46. The suspension support apparatus 9 is rotatably supported at the medium portion of the movable short link 43 via a free end support axle 50. Here, the movable short link 43 maintains a vertical posture, regardless of the posture of the link arm 7, because the fixed short link 42 is fixed in a vertical posture by the fixing beam 47. It goes without saying that the posture of the fixed short link 42 and movable short link 43 can be changed for each installation. As shown in FIG. 7, the movable short link 43 comprises a base end link section 43a supported by the free end shaft 27, a linking rod 43b that traverses over the arm cover 14, and a distal end link section 43c that is linked to the linking long link 44 via the linking rod 43b.

The apparatuses that can be employed as arm drive units for driving the raising and lowering apparatus 6 of the above-descried crank system may be (1) a rotary drive apparatus that rotates the first support axle 22, (2) a rotary drive apparatus that rotates the second support axle 25, and (3) a linear motion apparatus that moves the movable bearing stand 24 in the travel direction. Here, the rotary drive apparatus (1) that rotates the first support axle 22 is employed.

That is, as shown in FIG. 6B and FIG. 7, the arm drive unit 28 includes a first raising and lowering passive lever 29 is provided in a protruding manner from the first support axle 22 and a first linear drive apparatus 31 of a screw system for rotating the first passive lever 29. The first passive lever 29 is fixedly attached to the other end section of the first support axle 22. In the first linear drive apparatus 31 comprises a raising and lowering drive apparatus (electric motor) 34, a first ball screw shaft 35, and a first female screw member 36. The raising and lowering drive apparatus 34 is supported to be vertically swingable by the front support bracket 32 on the front side of the carriage body 5 via a horizontal pin 33. The first ball screw shaft 35 is linked to the output shaft of the raising and lowering drive apparatus 34 via a reducer. The first female screw member 36 receives the free end section of the first passive lever 29 in a rotatable fashion via a horizontal pin. This first female screw member 36 is screw-engaged with the first ball screw shaft 35.

Therefore, if the first ball screw shaft 35 is rotatively driven by the raising and lowering drive apparatus 34 and the first female screw member 36 moves forward, the first support axle 22 rotates via the first passive lever 29 within the range of $\theta°$ (for example, 160°). As a result, the swinging arm 8 rotates within the range of $\theta°$, the linking shaft 26 moves along the first circular arc trajectory H, and simultaneously the movable bearing stand 24 and second support axle 25 move along the linear trajectory I via the crank arm 7. By this, the crank arm 7 rotates about the second support axle 25 within the range of $\theta°$, the free end shaft 27 (and the free end support axle 50) is raised/lowered along the vertical trajectory J, and the suspension support apparatus 9 is raised/lowered.

Further, in a state where the crank arm 7 assumes the maximum angle of elevation and the free end support axle 50 moves to the uppermost position, as shown in FIG. 9A, the vehicle body M can be raised to the height of the conveying carriage 1, and in the upper end portion where the crank arm 7 assumes the maximum angle of elevation, for example, the vehicle body M assumes a liquid-entry posture or liquid-exit posture in which it is inclined at the largest angle. Furthermore, in the medium position in which the angle of elevation of the crank arm 7 is 0°, as shown in FIG. 9B, the vehicle body M is positioned slightly lower than the usual conveying posture (the posture shown in FIG. 1). Furthermore, in the lower limit position where the crank arm 7 assumes the maximum angle of elevation, the vehicle body M assumes an immersed posture in which the vehicle body M is lowered to the maximum depth of the processing liquid tank D as shown in FIG. 9C.

The suspension support apparatus 9 is provided with a suspension section parallel link mechanism 51. The suspension section parallel link mechanism 51 is composed of an upper frame 53, a pair of suspension frames 55, 55, and linking frames 56, 56. The upper frame 53 is rotatably supported via a boss section 52 by the free end support axle (support section) 50 of the intermediate section of the movable short link 43. Furthermore, the suspension frames 55, 55 are rotatably suspended from both ends of the upper frame 53 via suspension pins (linking sections) 54, 54 which are parallel to the free end support axle 50. The suspension frames 55, 55 are formed to be parallel to each other and have the same length. Furthermore, the suspension frames 55, 55 are respectively formed by the vertical beam 55a extending in the up-down direction and a transverse beam 55b protruding horizontally from the lower end portion of the vertical beam 55a to the processing liquid tank D, and have a L-like shape as viewed from the front thereof by the vertical beam 55a extending in the up-down direction. And the left and right pair of linking frames 56, 56 link therebetween the horizontal beams 55b rotatably. The linking frames 56, 56 are provided with holding tools 11, and the vehicle body M is supported by the suspension frames 55, 55 in a cantilever fashion via the holding tools 11. Since the suspension support apparatus 9 is so configured that the vehicle body M is supported in the cantilever fashion, there are no obstacles above the vehicle body M so that the vehicle body M can assume a largely inclined posture.

The upper frame 53 is formed by a horizontal section 53a having the boss section 52 below the central portion thereof, and inclined sections 53b, 53b tilted downward from both ends of the horizontal section 53a, and thus has a peak-like (inverted V) shape as viewed from lateral side thereof. Thereby, the interference of the upper frame 53 with the free end shaft 27 is avoided. Thus, forming the upper frame 53 to have a peak-like shape makes it possible to bring the crank arm 7 and upper frame 53 as close to each other as possible, to reduce the size of the entire structure, and to distribute the load of the vehicle body M. It goes without saying that the upper frame 53 can be also formed to have an inverted T shape, but in such case, the below-described power transmission gear apparatus 74 is inserted between the crank arm 7 and upper frame 53, the distance between the crank arm 7 and upper frame 53 increases, and the load of the vehicle body M is concentrated in one point.

As shown in FIG. 2, the upper frame 53 is so configured that the free end support axle 50 serving as an apex P1 in the horizontal posture and the suspension pins 54, 54 in the linking positions for supporting the suspension frames 55 form a triangular shape thereamong. As a result, the free end support axle 50 becomes the center of rotation of the upper frame 53. Furthermore, the linking frame 56 facing the upper frame 53 is so configured that the apex point P2, which forms the same triangular shape together with the linking sections of the transverse beams 55b, 55b, becomes the center of rotation of the linking frame 56. By this, the center P2 of rotation of the linking frame 56 is brought close to (or matched with) the center of gravity Gm of the vehicle body M carried on the linking frame 56 via the holding tool 11. As a result, it is possible to reduce the rotation torque of the free end support axle 50 at the time of posture adjustment thereof, and to reduce the amount of front-and-rear directional displacement of the vehicle body M at the time of posture adjustment. The resultant merit, as described hereinbelow, is that the operating power of the posture adjustment apparatus 60 can be reduced.

The posture adjustment apparatus 60 that drives and operates the suspension support apparatus 9 is provided to range from the movable bearing stand 24 to the free end support axle 50 of the movable short link 43 and crank arm 7, so that the suspension support apparatus 9 is operated to adjust the posture of the vehicle body M to be inclined forward, horizontal, and inclined backward. The posture adjustment apparatus 60 comprises a posture adjustment drive section 61 for rotating the second support axle 25, the wrapping connector drive apparatus 62 provided at the crank shaft 7, and the power transmission gear apparatus 74 for linking and coupling the free end shaft 27 and free end support axle 50.

As shown in FIGS. 6A and 7, the posture adjustment drive section 61 comprises a second passive lever 63 provided in a protruding fashion at the second support axle 25, and a second linear drive apparatus 64 of a screw system installed at the movable bearing stand 24 and causing the second support axle 25 to rotate via the second passive lever 63. The second linear drive apparatus 64 comprises a posture adjustment and drive apparatus (electric motor) 66, a second ball screw shaft 67, and a second female screw member 68. The posture adjustment and drive apparatus 66 is attached to a support bracket 65 installed on the bottom frame 24a of the movable bearing stand 24 to be able to swing up and down via a horizontal pin. The second ball screw shaft 67 is linked and coupled to the output shaft of the posture adjustment and drive apparatus 66 via a reducer. The second female screw member 68 is provided with the free end section of the second passive lever 63 in a rotatable fashion, and is screw-engaged with the second ball screw shaft 67.

As shown in FIG. 5, the wrapping connector drive apparatus 62 comprises a drive sprocket 71 fixed to one end portion of the second support axle 25, a passive sprocket 72 fixed to the free end shaft 27, and a power transmission chain 73 stretched between the drive sprocket 71 and the passive sprocket 72.

Further, as shown in FIG. 5, the power transmission gear 74 comprises a drive gear 75 fixed to the free end shaft 27 and a passive gear 76 fixed to the free end support axle 50 for engagement with a drive gear 75.

Therefore, when the second ball screw shaft 67 is driven to rotate by the posture adjustment and drive apparatus 66, the second support axle 25 is rotated by the second female screw member 68 via the second passive lever 63. The rotating power is transmitted from the second support axle 25 to the passive sprocket 72 via the drive sprocket 71 and power transmission chain 73 to cause the free end shaft 27 to rotate, and further the free end support axle 50 is caused to rotate via the drive gear 75 and passive gear 76 of the power transmission gear apparatus 74. As a result, the suspension support free end support axle 27 as its fulcrum and the posture of the vehicle body M is adjusted.

In FIG. 3, CP is a cover plate delineating the side of the conveying carriage 1 and the side of the processing liquid tank D, and an insertion space Pa where the first support axle 22 and second support axle 25 are joined and moved is formed parallel to the painting line R. Further, shaft section cover plates Cs are attached respectively to the first support axle 22 and second support axle 25 on both sides of the joint section.

The operation of the painting line system of the above-described configuration will be described below with reference to FIG. 11 and others.

Figure 11:
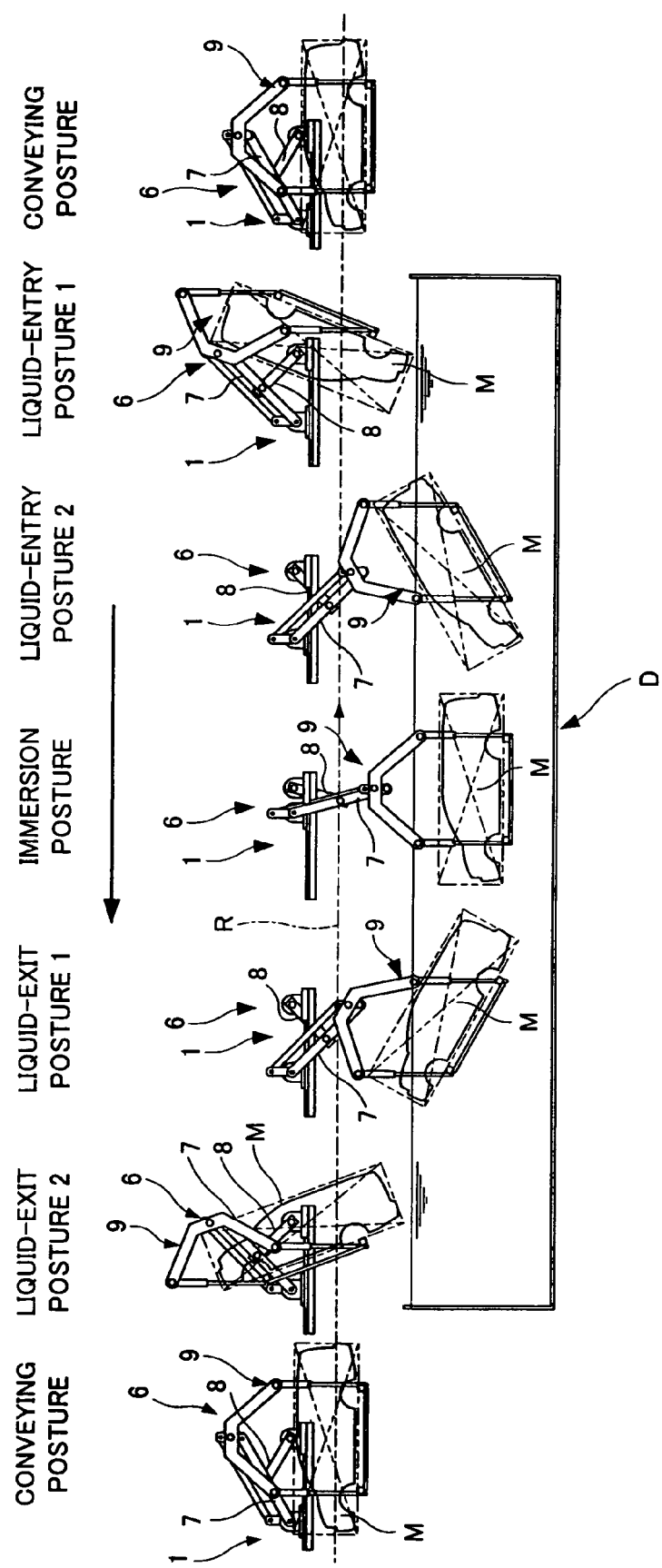
FIG. 11 is a side view illustrating the sequence of painting operations of the vehicle body.

1) The vehicle body M is held in a horizontal conveying posture in the intermediate position in the height direction and the conveying carriage 1 is guided along the travel rails G by the pressure roller travel apparatus 10 to move over the painting line R (conveying posture shown in FIG. 11).

2) When the conveying carriage 1 approaches the inlet opening of the processing liquid tank D, the arm drive unit 28 of the raising and lowering apparatus 6 is operated so that the first support axle 22 rotates, the free end section of the swinging arm 8 rotates upward, the crank arm 7 rotates upward via the linking shaft 26, and the movable bearing stand 24 moves. As a result, the crank arm 7 rotates about the second support axle 25 and the free end shaft 27 moves upward along the vertical trajectory J. At this time, the vertical posture of the movable short link 43 is maintained by the arm section parallel link mechanism 41, and the free end shaft 27 and free end support axle 50 are moved upward along the vertical trajectory J. Further, the free end support axle 50 is rotated by the posture adjustment apparatus 60 via the second linear drive apparatus 64, second passive lever 63, wrapping connector drive apparatus 62, and transmission gear unit 74. As shown in the figure, a liquid-entry posture is assumed in which the front section of the vehicle body M is inclined downward via the suspension support apparatus 9 (liquid-entry posture 1 shown in FIG. 11). The angle of the maximum inclination posture is 80°, for example. This angle depends on the vehicle body shape.

3) The arm drive unit 28 is operated so that, the first support axle 22 rotates backward, the swinging arm 8 rotates downward, and the free end shaft 27 and free end support axle 50 move downward along the vertical trajectory J. As a result, the vehicle body M enters the processing liquid in the processing liquid tank D via the suspension support apparatus 9 (liquid-entry posture 2 shown in FIG. 11).

4) When the vehicle body M approaches the lower limit, the vehicle body M is returned to the horizontal posture by the posture adjustment apparatus 60 via the suspension support apparatus 9 (immersion posture shown in FIG. 11).

5) When the conveying carriage 1 travels and the vehicle body is fully immersed in the processing liquid in the processing liquid tank D, the liquid-exit posture is assumed in which the front section of the vehicle body M is inclined upward by the posture adjustment apparatus 60 via the suspension support apparatus 9. At the same time, the first support axle 22 is rotated by the arm drive unit 28, so that the swinging arm 8 rotates upward, the movable bearing stand 24 moves, the free end shaft 27 of the crank arm 7 and the free ends support axle 50 move upward along the vertical trajectory J, and the vehicle body M is pulled out from the processing liquid in the processing liquid tank D (liquid-exit postures 1, 2 shown in FIG. 11).

6) If the crank arm 7 approaches the upper rotation limit and the vehicle body M is completely pulled out from the processing liquid in the processing liquid tank D, the front section of the vehicle body M is inclined downward by the posture adjustment apparatus 60 via the suspension support apparatus 9 and the horizontal conveying posture of the vehicle body is restored (conveying posture shown in FIG. 11).

In the above-described embodiment, the crank-type raising and lowering apparatus 6 comprises the crank arm 7 supported by the second support axle 25, the swinging arm 8 supported by the first support axle 22 and linked to the medium position of the crank arm 7, and the raising and lowering apparatus 6 in which the movable bearing stand 24 supporting the second support axle 25 can be brought close to or apart from the fixed bearing stand 21 supporting the first support axle 22, so that the free end support axle 50 disposed at the movable short link 43 on the free end side of the crank arm 7 can be raised and lowered along the vertical trajectory J in a substantially vertical direction. Thus, with the raising and lowering apparatus 6, the free end support axle 50 located on the free end side of the crank arm 7 can be raised and lowered along the substantially vertical direction, and the positional control of the vehicle body M can be facilitated by setting the raising and lowering trajectory of the vehicle body M to be linear, so that the raising and lowering operation necessary for the processing can be performed under simpler control. Furthermore, it is unnecessary to enlarge the shape of the inlet/outlet opening of the processing liquid tank D.

Further, the arm section parallel link mechanism 41 can increase the strength of the crank arm 7. Moreover, the free end support axle 50 is provided in the intermediate portion of the movable short link 43 of the vertical posture, so that the vehicle body M can be raised up to a high position and can be moved over such higher obstacles as branching sections of the travel rails G. Also, by changing the posture of the fixed short link 42 according to the specifications of the painting line system, the height position of the vehicle body M supported by the suspension support apparatus 9 can be selected as desired, which increases the degree of design freedom.

Further, with the suspension section parallel link mechanism 51 of the suspension support apparatus 9, the free end support axle 50 is disposed at a distance from and above a line connecting the suspension pins 54, 54 at both ends of the upper frame 53 in the horizontal posture, so that the center of rotation of the linking frame 56 having the tool 11 for holding the vehicle body M can be brought closer to or matched with the center of gravity Gm of the vehicle body M. As a result, the displacement of the vehicle body M occurring when it is rotated during posture adjustment can be decreased, and the posture control can be easily conducted. Furthermore, the torque of rotation about the free end support axle 50 during posture adjustment can be decreased, and both the running cost and system cost can be reduced.

In addition, since the suspension frame 55 is formed to have an L-like shape as viewed from the front thereof, there are no obstacles above the vehicle body M so that the vehicle body M can be inclined to a great extent. As a result, the allowed range of posture control of the vehicle body M can be expanded. Moreover, when the vehicle body M enters the zone above the holding tool 11 of the linking frame 56 or exits therefrom, a sufficient up-down raising and lowering stroke can be ensured, so that the operations can be conducted easily and rapidly.

What is claimed is:

1. A conveyor system in which a moving body is provided to be travelable along a processing line installed with a processing liquid tank, and a conveyed object held on the moving body is immersed into a processing liquid in the processing liquid tank and processed, wherein
   the moving body comprises:
   a suspended supporting apparatus for supporting the conveyed object;
   a raising and lowering device for raising and lowering the suspended supporting apparatus; and
   a posture adjustment apparatus for operating the suspended supporting apparatus and adjusting a posture of the conveyed object,
   the raising and lowering device comprising:
   a first support axle disposed on one of front and rear sides of the moving body in a travel direction thereof and extending orthogonally to the travel direction;
   a second support axle disposed on the other of the front and rear sides of the moving body in the travel direction thereof and extending in parallel to the first support axle, the second support axle being movable towards and away from the first support axle;
   a crank arm rotatably supported at a base end portion thereof by the second support axle and rotatably supporting the suspended supporting apparatus at a free end portion thereof;
   a swinging arm fixed at a base end portion thereof to the first support axle and coupled at a front end portion thereof to an intermediate position of the crank arm by means of a coupling axle; and
   an arm drive unit for causing the crank arm to rotate about the second support axle,
   the suspended supporting apparatus comprising a suspended section parallel link mechanism including an upper frame, a pair of suspended frames, and a linking frame,
   the upper frame being rotatably supported at a medium section thereof on the free end portion of the crank arm,
   the pair of suspended frames being rotatably suspended from both ends of the upper frame,
   the linking frame being rotatably linked between lower sections of the suspended frames and supporting the conveyed object,
   the support section of the upper frame and the linking sections between the upper frame and the suspended frames being configured to have a positional relationship to form a triangle thereamong, and
   the upper frame being formed to have an arch-like shape extending downward obliquely with an inclination on both sides from a vicinity of the support section of the crank arm.

2. The conveyor system according to claim 1, wherein the arm drive unit is configured so that the first support axle is rotated via a first passive lever by means of a first linear drive apparatus and the crank arm is rotated via the swinging arm, and the second support axle is configured to be brought close to or apart from the first support axle via a movable bearing stand that rotatably supports the second support axle.

3. The conveyor system according to claim 2, wherein the posture adjustment apparatus comprises:
   a second linear drive apparatus for rotating the second support axle via a second passive lever;
   a wrapping connector drive apparatus for operatively linking the second support axle and a free end shaft provided at the free end section of the crank arm;
   an arm section parallel link mechanism comprising a fixed short link supported by the crank arm and the second support axle and fixed to the movable bearing stand, a movable short link rotatably supported by the free end shaft of the crank arm, and a linking long link rotatably linked to the fixed short link and the movable short link;
   a free end support axle provided in a middle section of the movable short link; and
   a transmission gear unit for operatively linking the free end shaft and the free end support axle.

* * * * *